United States Patent
Casalaina et al.

(10) Patent No.: US 8,782,785 B2
(45) Date of Patent: *Jul. 15, 2014

(54) SYSTEM, METHOD AND COMPUTER PROGRAM PRODUCT FOR RENDERING DATA OF AN ON-DEMAND DATABASE SERVICE SAFE

(71) Applicant: salesforce.com, inc, San Francisco, CA (US)

(72) Inventors: Marco S. Casalaina, San Francisco, CA (US); Frank Dominguez, Jr., Redwood City, CA (US); Philippe G. D. Debaty, San Francisco, CA (US); Robert Fly, Orinda, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/717,539

(22) Filed: Dec. 17, 2012

(65) Prior Publication Data

US 2013/0111585 A1 May 2, 2013

Related U.S. Application Data

(63) Continuation of application No. 12/169,400, filed on Jul. 8, 2008, now Pat. No. 8,359,647.

(60) Provisional application No. 60/950,798, filed on Jul. 19, 2007.

(51) Int. Cl.
| | | |
|---|---|---|
| G06F 11/00 | (2006.01) | |
| G06F 21/60 | (2013.01) | |
| G06F 21/57 | (2013.01) | |
| G06F 21/62 | (2013.01) | |
| H04L 29/06 | (2006.01) | |

(52) U.S. Cl.
CPC .............. *G06F 21/60* (2013.01); *G06F 21/577* (2013.01); *G06F 21/6227* (2013.01); *H04L 63/1416* (2013.01)
USPC .......................................................... 726/22

(58) Field of Classification Search
CPC .... G06F 21/60; G06F 21/577; H04L 63/1416
USPC ............................. 726/22–25; 707/690, 692
See application file for complete search history.

(56) References Cited

U.S. PATENT DOCUMENTS

| | | |
|---|---|---|
| 5,577,188 A | 11/1996 | Zhu et al. |
| 5,608,872 A | 3/1997 | Schwartz et al. |

(Continued)

FOREIGN PATENT DOCUMENTS

KR    2007019190 A  *  2/2007

OTHER PUBLICATIONS

U.S. Appl. No. 60/828,192, filed Oct. 4, 2006.

*Primary Examiner* — Samson Lemma
(74) *Attorney, Agent, or Firm* — Zilka-Kotab, PC

(57) ABSTRACT

In accordance with embodiments, there are provided mechanisms and methods for rendering data of an on-demand database service safe. These mechanisms and methods for rendering on-demand database service data safe can enable embodiments to alleviate any security risk that would otherwise be posed by such data. The ability of embodiments to provide such additional safety may lead to improved security in the context of an on-demand database service.

18 Claims, 5 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,499,109 B1 * | 12/2002 | Balasubramaniam et al. ..... 726/22 |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,671,812 B1 * | 12/2003 | Balasubramaniam et al. ..... 726/22 |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,761,917 B1 * | 7/2010 | Kumar ............................ 726/23 |
| 7,797,743 B2 * | 9/2010 | Treacy et al. ................... 726/22 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0168065 A1 * | 7/2006 | Martin ........................ 709/206 |
| 2006/0206834 A1 | 9/2006 | Fisher et al. |
| 2007/0136417 A1 * | 6/2007 | Kreiner et al. ............... 709/203 |
| 2008/0022405 A1 * | 1/2008 | Wang et al. .................... 726/23 |
| 2008/0028469 A1 * | 1/2008 | Repasi et al. .................. 726/24 |
| 2008/0086775 A1 * | 4/2008 | Repasi et al. .................. 726/24 |
| 2008/0208868 A1 * | 8/2008 | Hubbard ........................ 707/10 |
| 2008/0249972 A1 | 10/2008 | Dillon |
| 2009/0055929 A1 * | 2/2009 | Lee et al. ....................... 726/23 |
| 2009/0063415 A1 | 3/2009 | Chatfield et al. |
| 2009/0328212 A1 * | 12/2009 | Repasi et al. .................. 726/23 |

* cited by examiner

SYSTEM, METHOD AND COMPUTER PROGRAM PRODUCT FOR RENDERING DATA OF AN ON-DEMAND DATABASE SERVICE SAFE

CLAIM OF PRIORITY

This application is a continuation of U.S. application Ser. No. 12/169,400, filed Jul. 8, 2008, which claims the benefit of U.S. Provisional Application No. 60/950,798, filed Jul. 19, 2007, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to securing systems, and more particularly to securing database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

There is often a desire to utilize rich text (e.g. with enhanced formatting, features, etc.) when assembling various documents for being served by the aforementioned database systems. Unfortunately, the use of such rich text and the like may pose a security risk during use. For example, various scripts may be included with a malicious intent. Such scripts may, for instance, allow access to otherwise secure data, be used to compromise a system, and/or initiate any other unwanted activity, etc.

BRIEF SUMMARY

In accordance with embodiments, there are provided mechanisms and methods for rendering data of an on-demand database service safe. These mechanisms and methods for rendering on-demand database services data safe can enable embodiments to alleviate any security risk that would otherwise be posed by such data. The ability of embodiments to provide such additional safety may lead to improved security in the context of an on-demand database service.

In an embodiment and by way of example, a method is provided for rendering data of an on-demand database service safe. In use, data capable of being displayed utilizing an on-demand database service is identified. Such data includes a plurality of codes. Thereafter, the codes of the data are analyzed to identify codes that pose a security risk. Further, the data is rendered safe, at least in part, by removing the codes identified to pose the security risk.

While the present invention is described with reference to an embodiment in which techniques for rendering on-demand database service data safe are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for rendering data of an on-demand database service safe.

The use of rich text and other enhanced features when assembling various documents for being served by on-demand database services potentially pose a security risk when such documents are served. Thus, mechanisms and methods are provided herein for rendering on-demand database service data safe can enable embodiments to alleviate any security risk that would otherwise be posed by such data. The ability of embodiments to provide such additional safety may lead to improved security in the context of an on-demand database service.

Next, mechanisms and methods for rendering on-demand database service data safe will be described with reference to exemplary embodiments.

Figure 1:
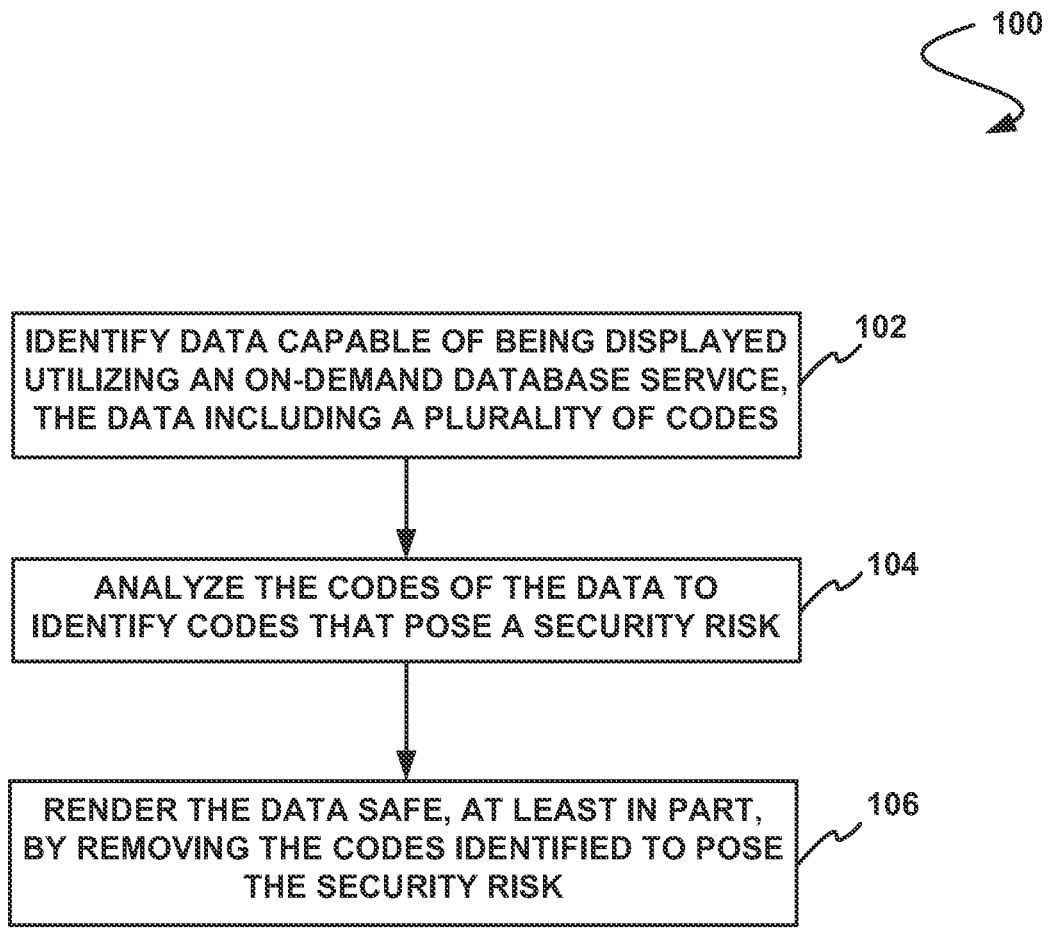
FIG. 1 shows a method for rendering data of an on-demand database service safe, in accordance with one embodiment.

FIG. 1 shows a method 100 for rendering data of an on-demand database service safe, in accordance with one embodiment. In operation, data capable of being displayed is identified utilizing an on-demand database service, the data including a plurality of codes. See operation 102. As an option, the data may be data that is identified by being received over a network or data that is identified in a database of the on-demand database service.

In the context of the present description, an on-demand database service may include any service that relies on a database system that is accessible over a network. In one embodiment, the on-demand database service may include a multi-tenant on-demand database service. In the present description, such multi-tenant on-demand database service may include any service that relies on a database system that is accessible over a network, in which various elements of hardware and software of the database system may be shared by one or more customers. For instance, a given application server may simultaneously process requests for a great number of customers, and a given database table may store rows for a potentially much greater number of customers.

Furthermore, in the context of the present description, data refers to any data that is capable of being displayed. For example, in various embodiments, the data may include a document, an image, a file, a media object, a flash object, an HTML object, and/or any other data that is capable of being displayed. Additionally, in one embodiment, the data may be associated with a field of a database of the on-demand database service. For example, the data may include customer relationship management data.

As shown further, the codes of the data are analyzed to identify codes that pose a security risk. See operation 104. In the context of the present description, codes refer to any item of data that has the ability to pose a security risk. For example, in various embodiments, the codes may include, mark-up language tags, characters or character sequences, bits or bit sequences, and/or any other code.

It should be noted that the codes of the data may be analyzed using a variety of techniques to identify the codes that pose a security risk. For example, the analysis may include comparing the data against at least one entity for identifying the codes that pose the security risk. In this case, the entity may include any object or information that may be used to identify the codes that pose the security risk. In various embodiments, the entity may include a whitelist, a blacklist, a pattern, and/or any other entity that meets the above definition.

In the context of the present description, a whitelist refers to any list indicating an acceptable or verified code. On the other hand, a blacklist refers to any list indicating an unacceptable or unverified code. Furthermore, the pattern may include any pattern that may indicate acceptable or unacceptable codes.

As another option, the analysis may include parsing the data. In this case, the data may be parsed and the analysis may be performed on at least some of the parsed data. In one embodiment, a spell check function may be performed in parallel with the analysis. In this case, the spell check function may be performed on at least some or all of the parsed data.

With further reference to FIG. 1, the data is rendered safe, at least in part, by removing the codes identified to pose the security risk. See operation 106. In one embodiment, it may be determined whether a predetermined functionality is enabled, and the data may conditionally be rendered safe based on the determination. In this case, the functionality may include spell check functionality, electronic messaging functionality, search engine functionality, reporting functionality, exporting functionality, listing functionality, and/or various other functionality.

In another embodiment, the rendering may be conditionally performed based on whether a security feature is enabled. For example, it may be determined that a user has enabled a security feature. Subsequently, the rending may be performed based on the determination.

It should be noted that the analyzing of the data and, the rendering, and any additional functionally described herein may be performed by a server of the on-demand database service. As an option, multiple servers associated with one or more on-demand database services may also be utilized.

Figure 2:
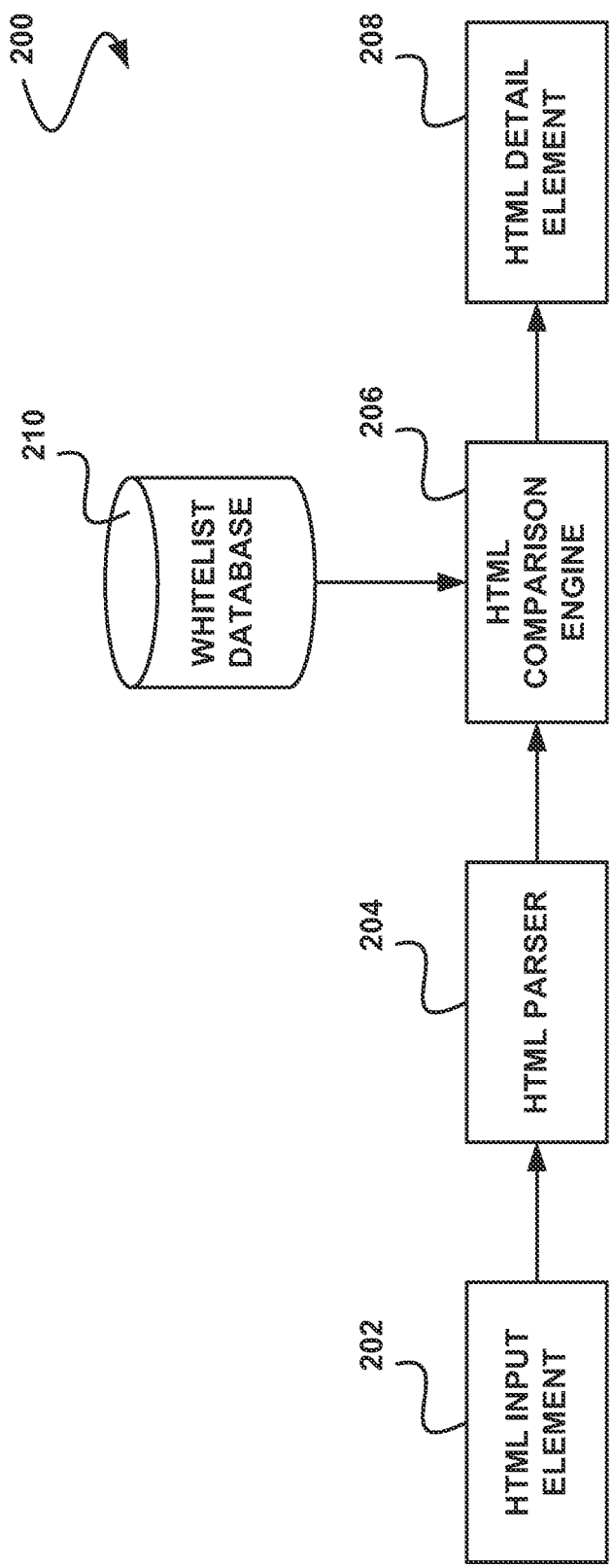
FIG. 2 shows a system for rendering data of an on-demand database service safe, in accordance with another embodiment.

FIG. 2 shows a system 200 for rendering data of an on-demand database service safe, in accordance with one embodiment. As an option, the present system 200 may be implemented in the context of the architecture and functionality of FIG. 1. Of course, however, the system 200 may be implemented in any desired environment. The aforementioned definitions may apply during the present description.

As shown, the system 200 includes an HTML input element 202, an HTML parser 204, an HTML comparison engine 206, an HTML detail element 208, and a database 210 including a whitelist. In operation, a user may input data using the HTML input element 202. The HTML parser 204 may then parse the data such that the HTML comparison engine 206 may compare at least some of the parsed data to items included in the whitelist. The HTML detail element 208 may then strip the parsed items not included in the whitelist, convert plaintext to HTML as needed, disable any links or other executable content by converting such content into text, and display the data.

In this way, different functions may strip potentially detrimental HTML code from data prior to saving or displaying such data. As an example, functionality that may require stripping of HTML may include spell check, email, submission to search engine for indexing, reports, export, lists, related lists, document search lists, etc.

As an option, the input to the HTML input element 202, such as an HTML document, may be stored in a database. In one embodiment, two versions of the HTML document may be stored, the actual HTML document and a stripped version without any HTML tags, or other code filtered using the whitelist. In this case, the two versions of the document may be synchronized when updates occur.

In another embodiment, the original HTML document may be stored and the HTML tags, or other codes, may be stripped when a text-only version is desired. In this case, all the locations in the application that may require runtime stripping of HTML, such as spell check, may be identified.

In one embodiment, existing documents, such as existing text documents may be transitioned into an HTML document. For example, until a document is saved using the system 200, the document may be considered a text document. Once a user has opened the text document using the HTML input element 202 and saved it, regardless of whether the user made any changes, the document may be translated into an HTML document.

As an option, all new documents may be an HTML document by default. In this way, an upgrade process may be simplified by enabling the update script to simply set the appropriate HTML solution preference and permission bits.

In one embodiment, the HTML input element 202 may include a user interface comprising a "Show HTML" checkbox and merge fields. The interface may also highlight the appropriate buttons for use depending on a cursor position. For example, the bold button may be highlighted if the cursor is on bold text.

Figure 3:
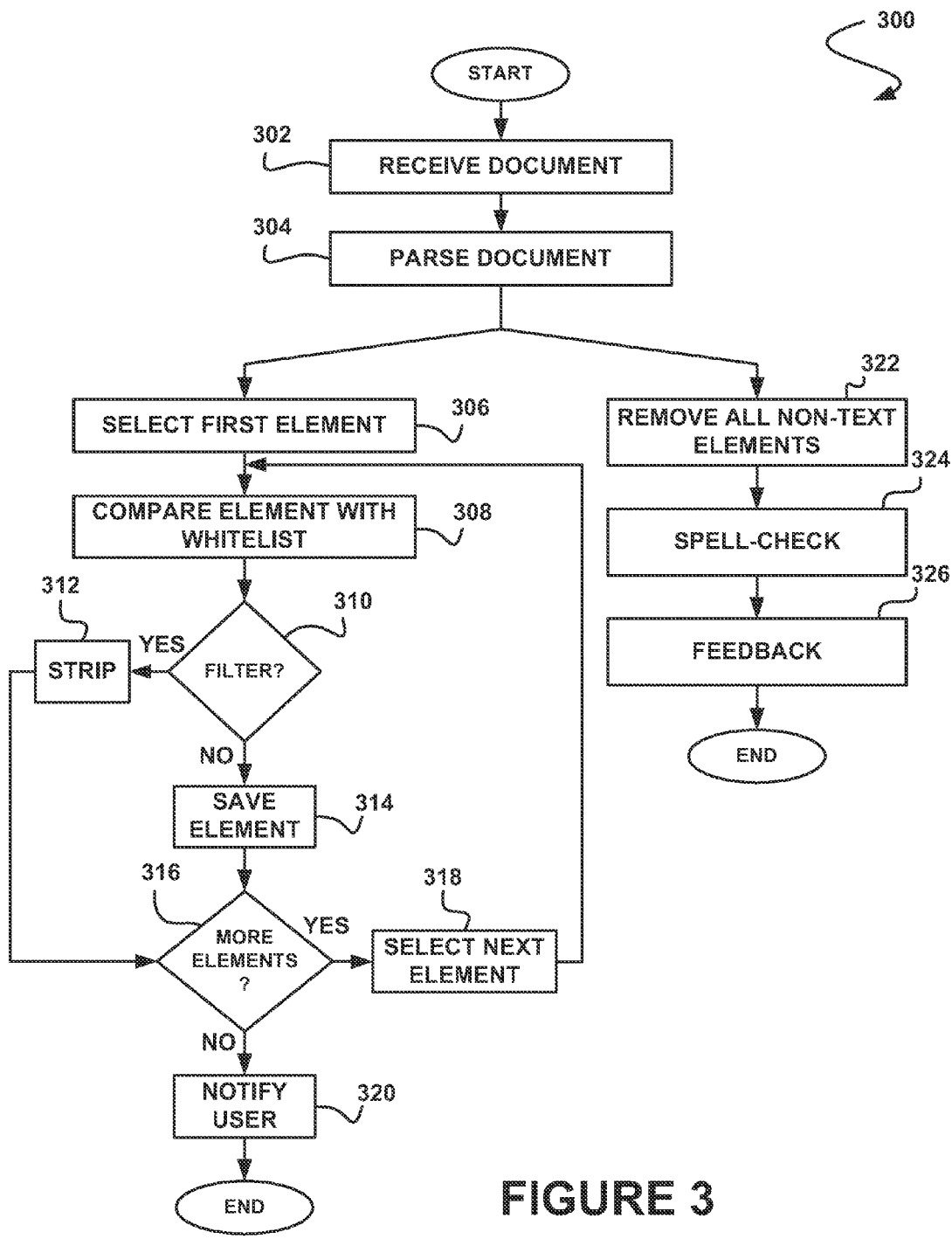
FIG. 3 shows a method for rendering data of an on-demand database service safe, in accordance with another embodiment.

FIG. 3 shows a method 300 for rendering data of an on-demand database service safe, in accordance with another embodiment. As an option, the present method 300 may be implemented in the context of the architecture and functionality of FIGS. 1-2. Of course, however, the method 300 may be carried out in any desired environment. Again, the aforementioned definitions may apply during the present description.

As shown, a document is received. See operation 302. As an option, the document may be received by a user saving the document using a user interface or by a user inserting data (e.g. text, etc.) into the user interface. It should be noted that any data may be received as part of the method 300 and such data is not limited to a document as discussed in the context of the present discussion.

Once the document is received, the document is parsed. See operation 304. In this case, the parsing may include parsing the document and extracting mark-up language tags or other code from the document. Once the document is parsed, the first element of the document is selected. See operation 306. The first element may be a tag or other code that was extracted as a result of the parsing, for example.

The first element is then compared to items in a whitelist. See operation 308. Thus, in the case the first element is a tag, the tag may be compared to a plurality of acceptable tags in the whitelist. In other embodiments, the first element may be compared to items in a blacklist or to an identifiable pattern.

Once the first element is compared to the items in the whitelist, it is determined whether to filter the first element. See operation 310. Thus, if a tag is not found in the whitelist, it may be determined that the tag is unacceptable and the tag may be stripped from the document. See operation 312.

It should be noted that any number of tags may be allowed or rejected. For example, in one embodiment, the whitelist may be configured to filter all script tags (e.g. Java™ script tags, etc.), certain style attribute tags, on-click attribute tags, mouse-over attribute tags, and/or any other tags.

If a tag is found in the whitelist, it may be determined that the tag is acceptable and the element may be saved. See operation 314. It is then determined whether there are any other elements to compare to items in the whitelist. See operation 316.

If there are additional elements to analyze, the next element is selected. See operation 318. If there are not any other elements to analyze, a user may be notified if any data was stripped from the document. See operation 320. In one embodiment, this notification may be a general notification indicating that at least some data was stripped. In another embodiment, the notification may include specific information corresponding to the stripped data.

Furthermore, in parallel with the analysis of the elements, all non-text elements are removed from the parsed document. See operation 322. Additionally, a spell check is performed on the textual elements. See operation 324.

Still yet, information may optionally be fed-back to the user. See operation 326. In this case, the information may include spell check results, stripping results, and or any other relevant information.

Figure 4:
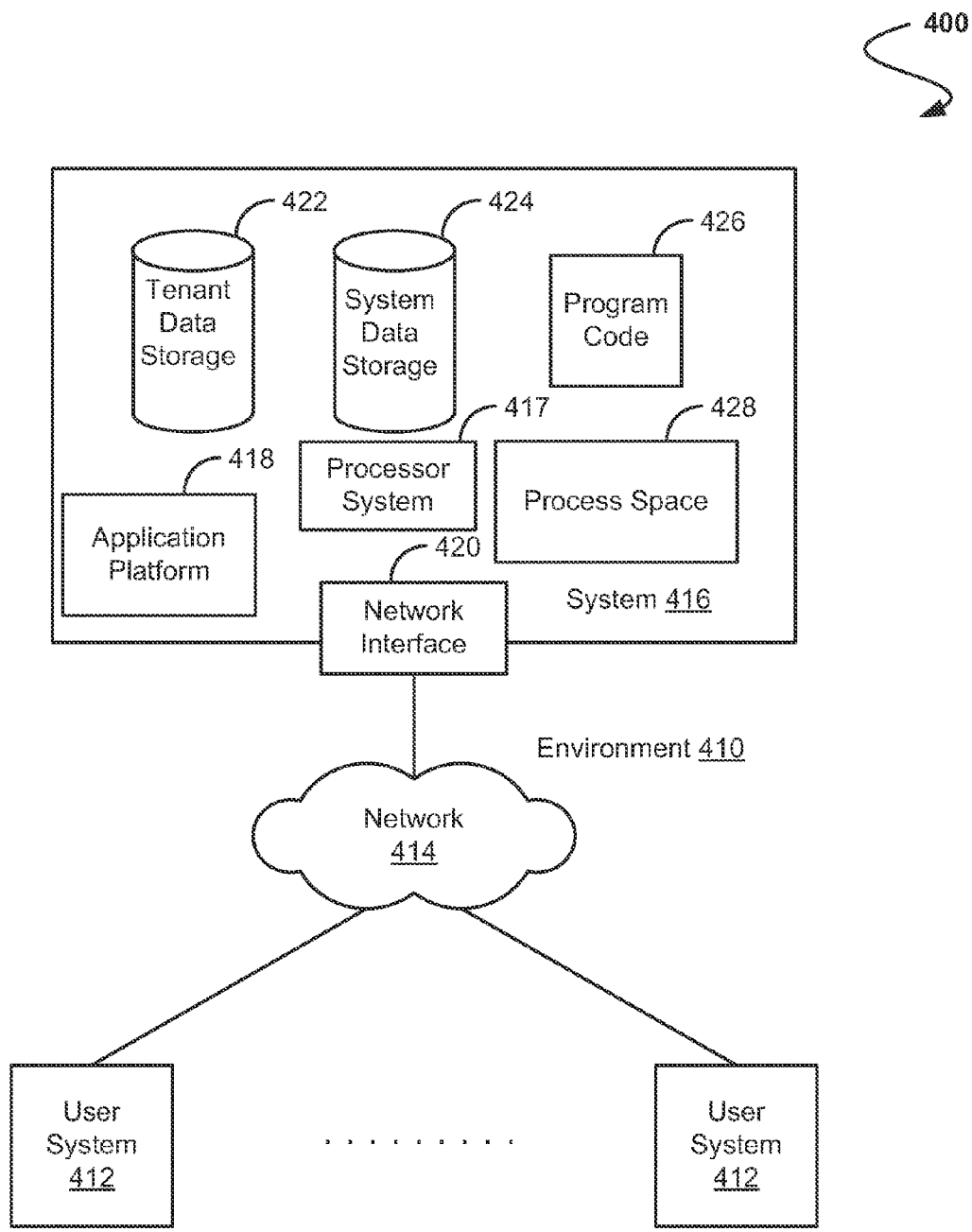
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "L" that network will be used in many of the examples herein. However, it should be understood that the networks that the present invention might use are not so limited, although TCP/1P is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
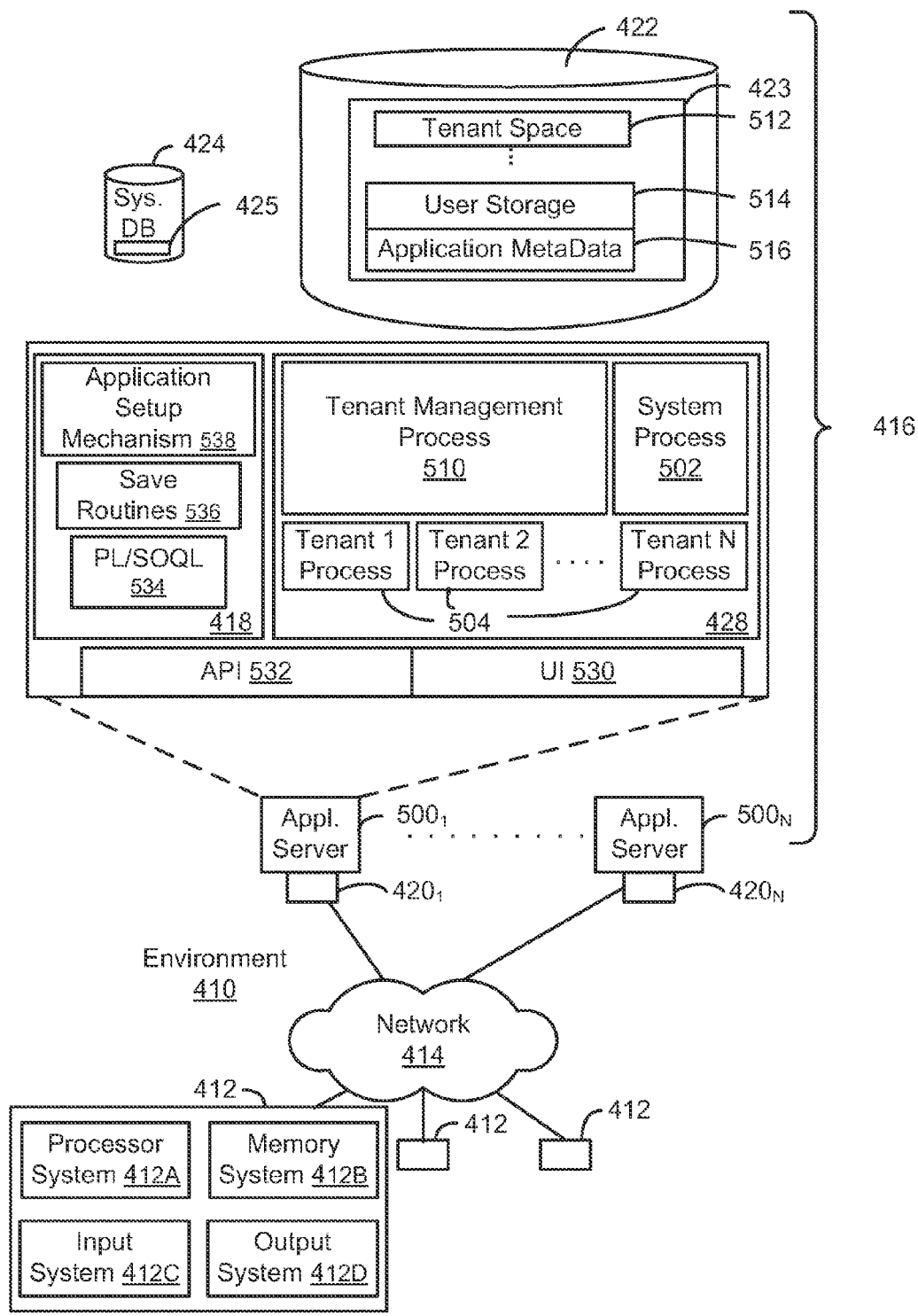
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, FDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828, 192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; and/or US2006/0206834, titled "SYSTEMS AND METHODS FOR IMPLEMENTING MULTI-APPLICATION TABS AND TAB SETS," filed Mar. 8, 2005; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
    identifying data belonging to a tenant in a database of an on-demand database service, the data capable of being displayed to a user of the on-demand database service, the data including at least one code, the data being associated with a field of the database of the on-demand database service;
    analyzing, utilizing a process of the on-demand database service, the at least one code of the data stored in the database of the on-demand database service to identify whether the at least one code poses a security risk;
    rendering the data safe, at least in part, by removing the at least one code identified to pose the security risk, utilizing a hardware processor; and
    storing the data and the data rendered safe to enable the data and the data rendered safe to be synchronized in response to an update request associated with one of the data and the data rendered safe.

2. The method of claim 1, wherein the data includes a document.

3. The method of claim 1, wherein the data includes customer relationship management data.

4. The method of claim 1, wherein the data is identified after being received over a network.

5. The method of claim 1, wherein the analyzing and the rendering are performed by a server of the on-demand database service.

6. The method of claim 1, wherein the at least one code includes at least one mark-up language tag.

7. The method of claim 1, wherein the analyzing includes comparing the at least one code against at least one entity for identifying whether the at least one code poses the security risk.

8. The method of claim 7, wherein the entity includes a whitelist.

9. The method of claim 7, wherein the entity includes a blacklist.

10. The method of claim 7, wherein the entity includes a pattern.

11. The method of claim 1, wherein the analyzing includes parsing the at least one code.

12. The method of claim 1, wherein a spell check function is performed in parallel with the analyzing.

13. The method of claim 1, and further comprising determining whether a security feature is enabled by a user, and conditionally performing the rendering based on the determination.

14. The method of claim 1, and further comprising determining whether predetermined functionality is enabled, wherein the data is conditionally rendered safe based on the determination.

15. The method of claim 14, wherein the functionality includes at least one of spell check functionality, electronic messaging functionality, search engine functionality, reporting functionality, exporting functionality, and listing functionality.

16. A non-transitory machine-readable medium carrying one or more sequences of instructions which, when executed by one or more processors, cause the one or more processors to carry out the steps of:
   identifying data belonging to a tenant in a database of an on-demand database service, the data capable of being displayed to a user of the on-demand database service, the data including at least one code, the data being associated with a field of the database of the on-demand database service;
   analyzing, utilizing a process of the on-demand database service, the at least one code of the data stored in the database of the on-demand database service to identify whether the at least one code poses a security risk;
   rendering the data safe, at least in part, by removing the at least one code identified to pose the security risk; and
   storing the data and the data rendered safe to enable the data and the data rendered safe to be synchronized in response to an update request associated with one of the data and the data rendered safe.

17. An apparatus, comprising:
a processor; and
   one or more stored sequences of instructions which, when executed by the processor, cause the processor to carry out the steps of:
      identifying data belonging to a tenant in a database of an on-demand database service, the data capable of being displayed to a user of the on-demand database service, the data including at least one code, the data being associated with a field of the database of the on-demand database service;
      analyzing, utilizing a process of the on-demand database service, the at least one code of the data stored in the database of the on-demand database service to identify whether the at least one code poses a security risk;
      rendering the data safe, at least in part, by removing the at least one code identified to pose the security risk; and
      storing the data and the data rendered safe to enable the data and the data rendered safe to be synchronized in response to an update request associated with one of the data and the data rendered safe.

18. A method, comprising:
identifying data belonging to a tenant in a database of an on-demand database service, the data capable of being displayed to a user of the on-demand database service, the data including at least one code, the data being associated with a field of the database of the on-demand database service;
analyzing, utilizing a process of the on-demand database service, the at least one code of the data stored in the database of the on-demand database service to identify whether the at least one code poses a security risk;
rendering the data safe by selecting, based at least in part upon whether the at least one code poses a security risk, one of the data and a copy of the data having the at least one code removed, utilizing a hardware processor; and
storing the data rendered safe in the database of the on-demand database service.

* * * * *